US012412986B2

(12) United States Patent
Byers et al.

(10) Patent No.: US 12,412,986 B2
(45) Date of Patent: Sep. 9, 2025

(54) METHOD FOR TUNING AN ELECTRICALLY SMALL ANTENNA

(71) Applicant: Honeywell Federal Manufacturing & Technologies, LLC, Kansas City, MO (US)

(72) Inventors: Kyle J. Byers, Kansas City, MO (US); Louis Brown, Kansas City, MO (US); Daniel John Salzman, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 96 days.

(21) Appl. No.: 18/483,188

(22) Filed: Oct. 9, 2023

(65) Prior Publication Data

US 2024/0072449 A1 Feb. 29, 2024

Related U.S. Application Data

(62) Division of application No. 17/940,800, filed on Sep. 8, 2022, now Pat. No. 11,990,691, which is a division of application No. 16/918,157, filed on Jul. 1, 2020, now Pat. No. 11,489,263.

(51) Int. Cl.

| | |
|---|---|
| ***H01Q 1/36*** | (2006.01) |
| ***H01Q 9/14*** | (2006.01) |
| ***H01Q 9/30*** | (2006.01) |

(52) U.S. Cl.

CPC ................. *H01Q 9/14* (2013.01); *H01Q 1/36* (2013.01); *H01Q 9/30* (2013.01)

(58) Field of Classification Search

CPC .. H01Q 1/36; H01Q 1/14; H01Q 9/30; H01Q 9/14; H01Q 5/30

See application file for complete search history.

(56) References Cited

U.S. PATENT DOCUMENTS

| | | | | |
|---|---|---|---|---|
| 10,020,586 | B1 * | 7/2018 | Georgakopoulos .. | H01Q 11/086 |
| 10,811,777 | B1 * | 10/2020 | Fuchi ........................ | H01Q 3/01 |
| 10,833,392 | B1 * | 11/2020 | Zekios ............... | H01Q 15/0013 |
| 2014/0266975 | A1 * | 9/2014 | Grbic ...................... | H01P 11/00 343/895 |
| 2014/0340275 | A1 * | 11/2014 | Georgakopoulos ...... | H01Q 1/36 343/834 |
| 2017/0025748 | A1 * | 1/2017 | Georgakopoulos ...... | H01Q 1/36 |
| 2018/0166776 | A1 * | 6/2018 | Ziegler .................... | H01Q 1/52 |
| 2018/0205153 | A1 * | 7/2018 | Georgakopoulos .. | H01Q 11/086 |
| 2020/0067195 | A1 * | 2/2020 | Byers ................... | H01Q 1/2283 |
| 2021/0013614 | A1 * | 1/2021 | Georgakopoulos .... | H01Q 1/288 |

* cited by examiner

*Primary Examiner* — Awat M Salih

(74) *Attorney, Agent, or Firm* — Hovey Williams LLP

(57) ABSTRACT

A method of tuning an electrically small antenna comprising a radiating element and a support structure comprises applying a force to the support structure to change a shape or a dimension of the radiating element to increase or decrease a frequency at which the electrically small antenna resonates.

20 Claims, 8 Drawing Sheets

METHOD FOR TUNING AN ELECTRICALLY SMALL ANTENNA

RELATED APPLICATION

The current patent application is a divisional patent application which claims priority benefit, with regard to all common subject matter, of earlier-filed U.S. patent application Ser. No. 17/940,800; titled "METHOD FOR TUNING AN ELECTRICALLY SMALL ANTENNA", filed Sep. 8, 2022, which is a divisional patent application that claims priority benefit, with regard to all common subject matter, of earlier-filed U.S. patent application Ser. No. 16/918,157; titled "METHOD FOR TUNING AN ELECTRICALLY SMALL ANTENNA", filed Jul. 1, 2020. The earlier-filed patent applications are hereby incorporated by reference, in their entireties, into the current patent application.

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

FIELD OF THE INVENTION

Embodiments of the current invention relate to methods for tuning an electrically small antenna.

DESCRIPTION OF THE RELATED ART

An electrically small antenna is generally classified as an antenna formed on a volume with a spherical diameter that is significantly smaller than a wavelength of a wireless signal the antenna is supposed to transmit and/or receive. Typically, electrically small antennas are configured to fit into small spaces or areas in which tuning of the antenna may be difficult. Furthermore, in some cases, tuning of the electrically small antenna may result in a loss bandwidth of the wireless signal the antenna is to transmit and/or receive.

SUMMARY OF THE INVENTION

Embodiments of the current invention solve the above-mentioned problems and provide methods of tuning an electrically small antenna that can be easily and automatically implemented and that do not result in the loss bandwidth of a wireless signal the antenna is to transmit and/or receive. The electrically small antenna comprises a radiating element configured to transmit and/or receive the wireless signal and a support structure on which the radiating element is positioned. One method of tuning the electrically small antenna broadly comprises applying forces to the support structure to change a shape or a dimension of the radiating element to increase or decrease a frequency at which the electrically small antenna resonates.

Another method of tuning an electrically small antenna broadly comprises positioning the electrically small antenna on an upper surface of a planar object; coupling a first component of a mechanism to the support structure; coupling a second component of the mechanism to the planar object; and applying a mechanical action to the first component, the second component, or both to exert a force on the support structure to change a shape or a dimension of the radiating element to increase or decrease a frequency at which the electrically small antenna resonates.

Another method of tuning an electrically small antenna broadly comprises applying at least a first force to the support structure to an upper portion of the support structure in a first direction to create a torsion on the support structure that changes a shape or a dimension of the radiating element to increase or decrease a frequency at which the electrically small antenna resonates.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
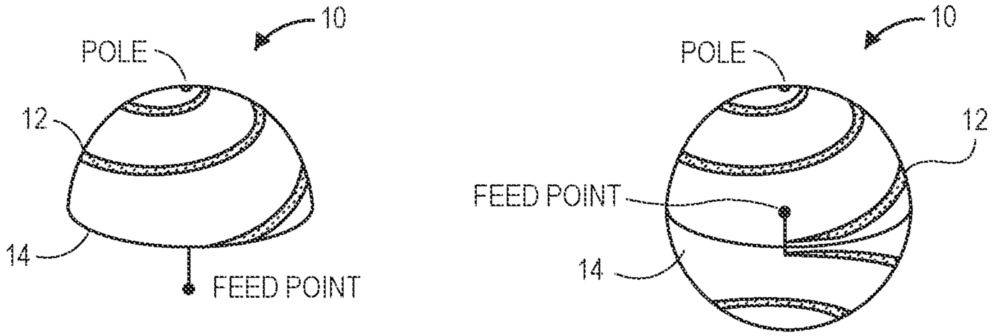
FIG. 1 is a perspective view of first and second embodiments of an electrically small antenna.
Figure 2:
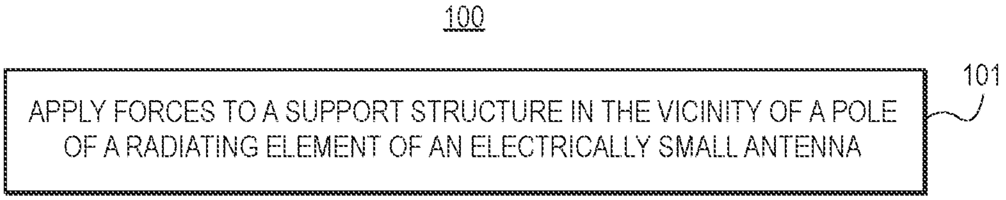
FIG. 2 illustrates a listing of a step of a first method of tuning an electrically small antenna.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

An electrically small antenna 10, constructed in accordance with various embodiments of the current invention, is shown in FIG. 1. The electrically small antenna 10 typically has small dimensions compared to a wavelength of a wireless signal the electrically small antenna 10 is configured to transmit and/or receive. Generally, a volume containing an electrically conductive, radiating element of the electrically small antenna 10 has a spherical diameter much less than the wavelength of the wireless signal. Thus, other configurations or types of antennas may be considered electrically small antennas as long as they meet this criterion.

The electrically small antenna 10 may be embodied by a hemispherical helical monopole antenna as shown in the left image of FIG. 1, or a spherical helical dipole antenna as shown in the right image of FIG. 1. The electrically small antenna 10 includes at least one radiating element 12 and a support structure 14. The radiating element 12 is generally formed from electrically conductive material including metals and metal alloys and is configured to transmit and/or receive a wireless signal. The radiating element 12 may have an exemplary helical shape in a monopole configuration or a dipole configuration. The radiating element 12 may include a feed point at a first end and a pole at a second, opposing end. The support structure 14 is generally formed from electrically insulating or dielectric materials, including polymers, ceramics, fiberglass, etc. The support structure 14 may have a roughly hemispherical or roughly spherical shape, an oblate or prolate spheroid shape, or the like and may be solid with an outer surface or hollow with a wall including an inner surface and an outer surface. The radiating element 12 is positioned on the outer surface of the support structure 14. In some embodiments, the radiating element 12 may be formed separately and attached to the outer surface of the support structure 14. In other embodiments, the radiating element 12 may be printed or deposited and etched on the outer surface of the support structure 14. In yet other embodiments, the support structure 14 may be formed from a thermoplastic material doped with a (non-conductive) metallic inorganic compound activated by a laser utilizing a laser direct structuring process. The radiating element 12 may be formed by the laser striking the outer surface of the support structure 14 in the helical pattern, which activates the inorganic compound to become electrically conductive.

Figure 3A:
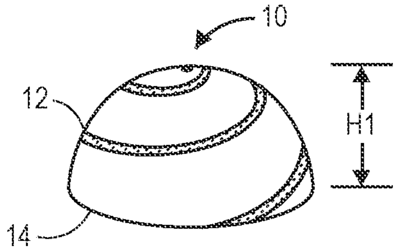
FIG. 3A is a perspective view of the electrically small antenna illustrating a first height of the antenna.
Figure 3B:
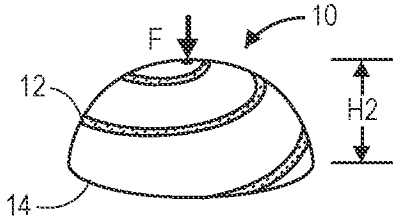
FIG. 3B is a perspective view of the electrically small antenna illustrating a downward force applied which results in a second height of the antenna.
Figure 3C:
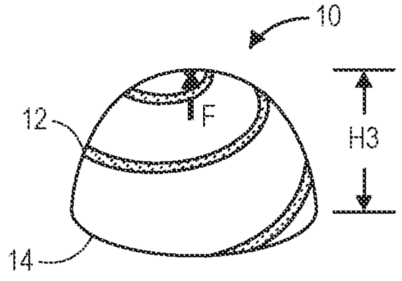
FIG. 3C is a perspective view of the electrically small antenna illustrating an upward force applied which results in a third height of the antenna.

Referring to FIGS. 2, 3A, 3B, and 3C, a first method 100 of tuning the electrically small antenna 10 is illustrated. Referring to step 101, the method broadly comprises applying forces to the surfaces of the support structure 14 in the vicinity of the pole of the radiating element 12. The electrically small antenna 10 is shown in FIG. 3A with no forces applied to the support structure 14. (To illustrate the method 100, the hemispherical helical monopole antenna embodiment of the electrically small antenna 10 is shown. The method is implemented in a similar manner for the spherical helical dipole antenna embodiment of the electrically small antenna 10.) In this default state, the support structure 14 has a first height of H1. Shown in FIG. 3B, a first force is applied downward, as a push on the outer surface of the support structure 14 or as a pull on the inner surface of the support structure. The first force results in the support structure 14 having a second height of H2, which is less than H1. Shown in FIG. 3C, a second force is applied upward, as a push on the inner surface of the support structure 14 or a pull on the outer surface of the support structure 14. The second force results in the support structure 14 having a third height of H3, which is greater than H1. Other forces may be applied to the support structure in other locations or in other directions than those shown in FIGS. 3B and 3C, which may change other dimensions. Each force may change the shape or dimensions of the support structure 14, which in turn changes the shape or dimensions of the radiating element 12, which may increase or may decrease the frequency at which the radiating element 12 resonates—thereby tuning the electrically small antenna 10. The forces may be applied using manual techniques or automated techniques involving mechanisms, machines, and/or robots.

Figure 4A:
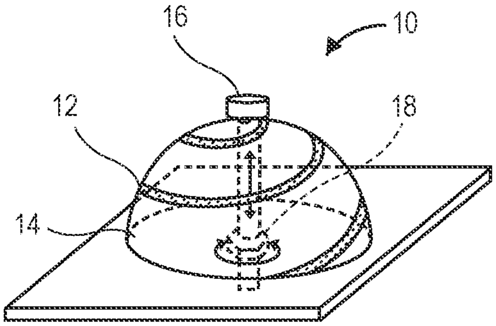
FIG. 4A is a perspective view of the electrically small antenna illustrating some embodiments of a manual implementation of the first method of tuning the electrically small antenna.
Figure 4B:
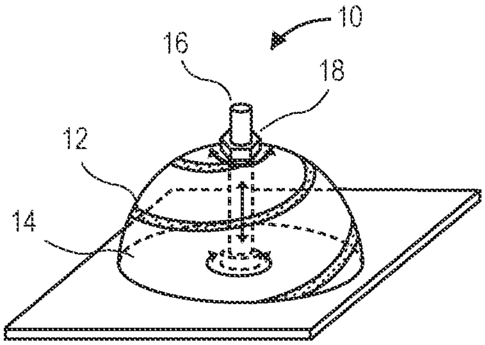
FIG. 4B is a perspective view of the electrically small antenna illustrating other embodiments of the manual implementation of the first method of tuning the electrically small antenna.

Referring to FIGS. 4A and 4B, a manual implementation of the first method 100 of tuning the electrically small antenna 10 is shown. A mechanism including a bolt 16 and a nut 18 assembly may be utilized to apply forces to the support structure 14 to change its shape or dimensions. The bolt 16 may have outer threads, and the nut 18 may have complementary inner threads that couple with the threads of the bolt 16 in a known fashion. A planar surface or other object, such as a printed circuit board or the like, may retain the electrically small antenna 10, such that a lower edge of the support structure 14 rests on the planar surface or upper surface of the planar object. In some embodiments as shown in FIG. 4A, the bolt 16 is positioned in an opening in the support structure 14 such that a head of the bolt 16 is coupled to the support structure 14 near its apex in the vicinity of the pole of the radiating element 12. The other end of the bolt 16 is positioned in an opening in the planar object aligned with a center of the support structure 14. The nut 18 may be coupled to the bolt 16 on the opposing side of the planar surface and coupled thereto. In other embodiments as shown in FIG. 4B, the bolt 16 is positioned in an opening in the planar object, with the head of the bolt 16 positioned on and coupled to a lower surface of the planar object. The other end of the bolt 16 extends through an opening in the support structure 14 near its apex in the vicinity of the pole of the radiating element 12. The nut 18 is attached to the bolt 16 and coupled to the support structure 14.

Rotation of the bolt 16 and/or the nut 18 generally causes axial motion of the nut 18 along the bolt 16. But, given that the nut 18 and the head of the bolt 16 are coupled to the planar object and the support structure 14, respectively in some embodiments, and to the support structure 14 and the planar object, respectively in other embodiments, rotation of the bolt 16 and/or the nut 18 in a first direction exerts an upward force on the support structure 14, which may increase its height. Rotation of the bolt 16 and/or the nut 18 in a second direction, opposite the first direction, exerts a downward force on the support structure 14, which may decrease its height. The forces may change the shape or dimensions of the support structure 14, which in turn changes the shape or dimensions of the radiating element 12, which may increase or may decrease the frequency at which the radiating element 12 resonates—thereby tuning the electrically small antenna 10.

Figure 5A:
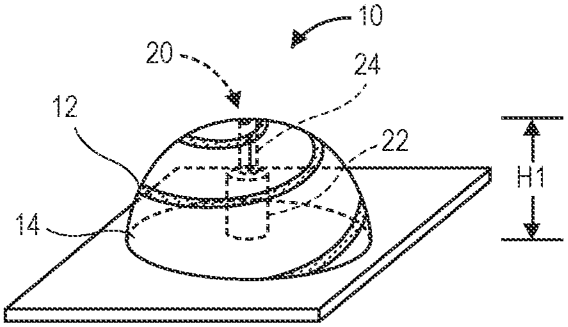
FIG. 5A is a perspective view of the electrically small antenna including an actuator exerting no force which results in a first height of the antenna.
Figure 5B:
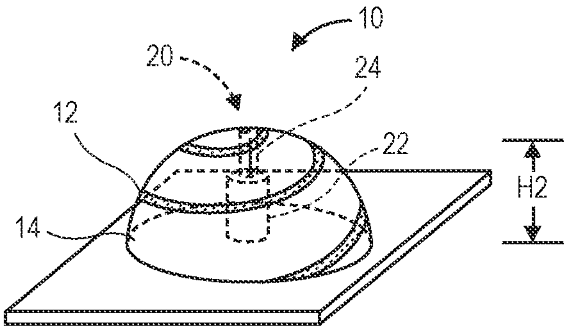
FIG. 5B is a perspective view of the electrically small antenna including the actuator exerting a downward force which results in a second height of the antenna.
Figure 5C:
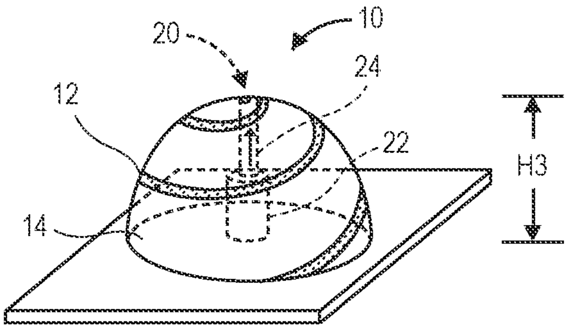
FIG. 5C is a perspective view of the electrically small antenna including the actuator exerting an upward force which results in a third height of the antenna.

Referring to FIGS. 5A, 5B, and 5C, an automated implementation of the first method 100 of tuning the electrically small antenna 10 is shown. A mechanism including a servo controlled actuator 20 may be utilized to automatically apply forces to the support structure 14 to change its shape or dimensions. The actuator 20 may include a body 22 and an arm 24. The body 22 may have a generally cylindrical shape and may house a servo motor or similar device which is able to, or configured to, adjust a length or extension of the arm 24. The arm 24 is typically cylindrical or rod shaped and is telescopically coupled to the body 22 such that the arm 24 extends from and retracts into the body 22. The actuator 20 may be positioned on a planar surface or other object that is retaining the electrically small antenna 10. Specifically, the body 22 of the actuator 20 may be positioned on the planar surface while the arm 24 is fixedly coupled to the inner surface of the support structure 14. The actuator 20 is configured, or adjusted, such that the arm 24 is in a neutral position with respect to the body 22, as shown in FIG. 5A. And, the support structure 14 has a first height of H1. The arm 24 is retracted into the body 22 at least partially, which applies a downward force and pulls on the support structure 14, as shown in FIG. 5B. The support structure 14 has a second height of H2, which is less than H1. The arm 24 is extended from the body 22 at least partially, which applies an upward force and pushes on the support structure 14, as shown in FIG. 5C. The support structure 14 has a third height of H3, which is greater than H1. As mentioned above, the changes in shape or dimensions of the support structure 14 result in changes in shape or dimensions of the radiating element 12, which may increase or may decrease the frequency at which the radiating element 12 resonates—thereby tuning the electrically small antenna 10.

Figure 6:
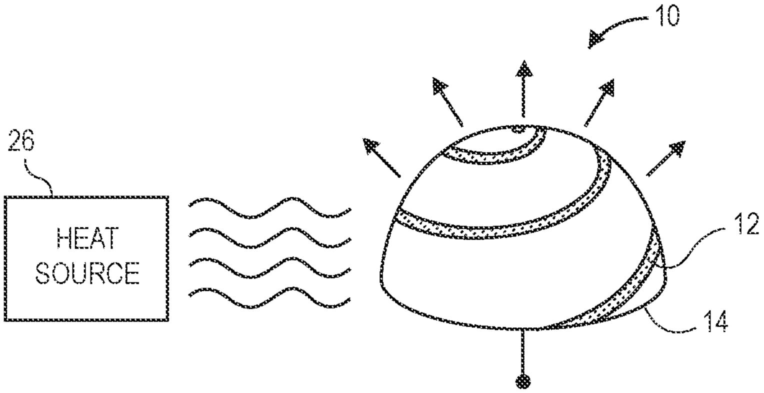
FIG. 6 is a perspective view of the electrically small antenna with a heat source that generates heat toward the antenna.

Referring to FIG. 6, another variation of the first method 100 of tuning the electrically small antenna 10 involves applying thermal energy, or heat, to the support structure 14. A heat source 26 generally provides the thermal energy. The heat source 26 may be external to the electrically small antenna 10, but in close proximity thereto. Or, the heat source 26 may be integrated with the electrically small antenna 10 such as a current carrying wire or resistive element embedded in, or coupled to, the support structure 14. Current flow through the wire or resistive element generates heat. The heat generated from the heat source 26 results in expansion of the material of the support structure 14 that varies according to a coefficient of thermal expansion for the material. Expansion of the support structure 14 changes the shape or dimensions of the radiating element 12, which may increase or may decrease the frequency at which the radiating element 12 resonates—thereby tuning the electrically small antenna 10.

Figure 7A:
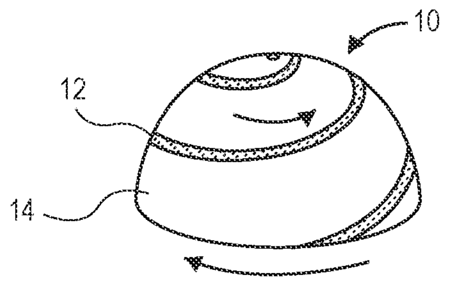
FIG. 7A is a perspective view of the electrically small antenna with first and second opposing forces exerting a torsion on the antenna.
Figure 7B:
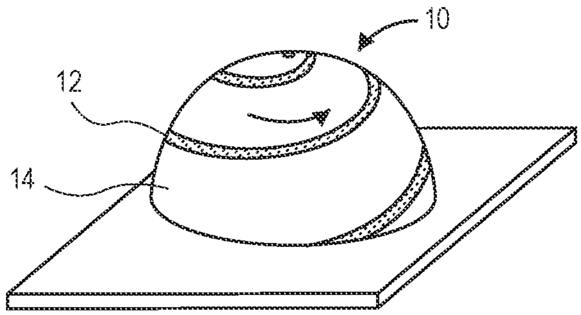
FIG. 7B is a perspective view of the electrically small antenna attached to a planar surface and including a first force exerting a torsion on the antenna.
Figure 8A:
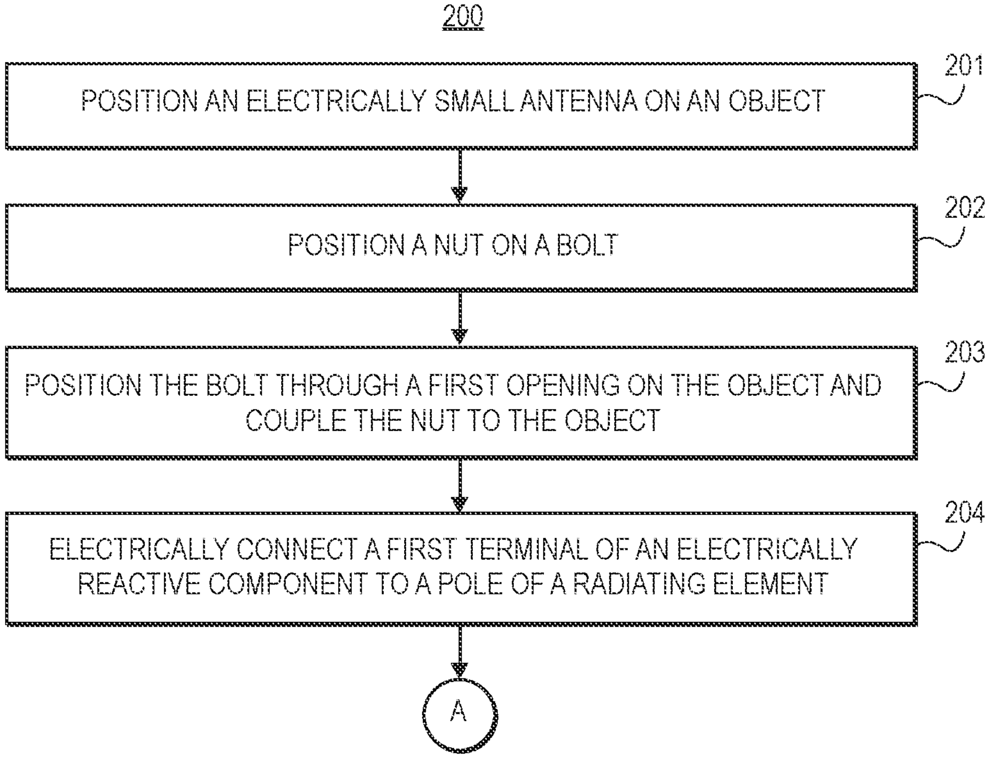
FIGS. 8A and 8B illustrate a listing of the steps of a second method of tuning an electrically small antenna.
Figure 8B:
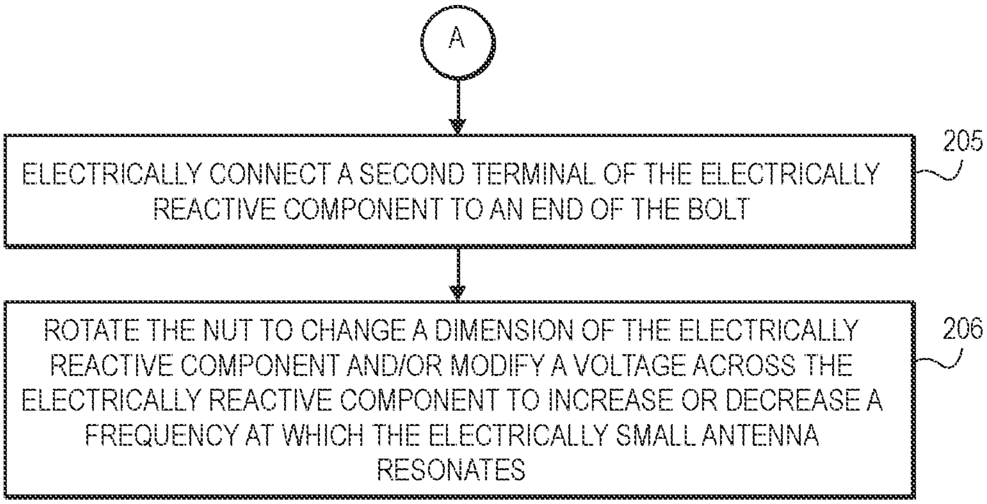

Referring to FIGS. 7A and 7B, yet another variation of the first method 100 of tuning the electrically small antenna 10 involves applying a torsional, or twisting, force to the support structure 14. A first force in a first direction, such as counterclockwise, may be applied, as shown in FIG. 7A, near the apex of the support structure 14, while a second force in a second direction, such as clockwise, may be applied to the base of the support structure 14. In other embodiments, the first direction may be clockwise, while the second direction may be counterclockwise. Alternatively, the base of the support structure 14 may be rigidly attached to a planar surface or other object that holds the base of the support structure 14 in a fixed position, as shown in FIG. 7B. And, a force may be applied near the apex of the support structure 14 in either a clockwise or a counterclockwise direction. In either implementation of the fifth method, the support structure 14 is twisted such that the shape or dimension of the radiating element 12 changes, which may increase or may decrease the frequency at which the radiating element 12 resonates—thereby tuning the electrically small antenna 10.

Figure 9:
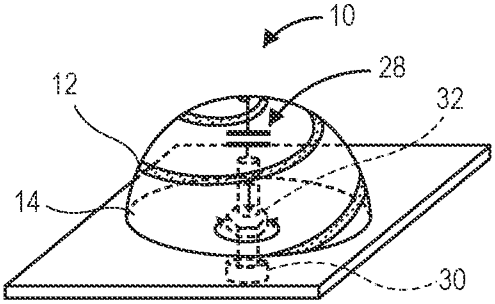
FIG. 9 is a perspective view of the electrically small antenna with a first electrically reactive component to implement the second method of tuning the electrically small antenna.
Figure 10:
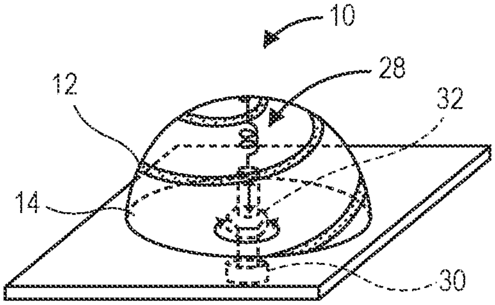
FIG. 10 is a perspective view of the electrically small antenna with a second electrically reactive component to implement the second method of tuning the electrically small antenna.

Referring to FIGS. 8A, 8B, 9, and 10, a second method 200 of tuning the electrically small antenna 10 is illustrated. At least a portion of the steps of the method 200 are listed in FIGS. 8A and 8B. The steps may be performed in the order shown in FIGS. 8A and 8B, or they may be performed in a different order. Furthermore, some steps may be performed concurrently as opposed to sequentially. In addition, some steps may be optional or may not be performed. The method 200 broadly involves passive electronic and mechanical tuning. Referring to step 201, the electrically small antenna 10 may be retained on a planar surface or other object. An electrically reactive component 28, a bolt 30, and a nut 32 are also included to implement the method 200. In some embodiments, the electrically reactive component 28 is a capacitor, as shown in FIG. 9. In other embodiments, the electrically reactive component 28 is an inductor, as shown in FIG. 10. The bolt 30 and the nut 32 are similar in structure to bolt 16 and the nut 18 described above. Alternatively, bolt 30 and nut 32 could be replaced with other mechanical means including, for example, the actuator 20. Referring to steps 202 and 203, the bolt 30 is positioned in an opening in the planar surface, and the nut 32 is coupled to the bolt 30 as well as the planar surface. The bolt 30 may also be electrically connected to electrical ground. Referring to step 204, a first terminal of the electrically reactive component 28 is electrically and mechanically connected to the pole of the radiating element 12. Referring to step 205, a second terminal of the electrically reactive component 28 is electrically and mechanically connected to the bolt 30. Referring to step 206, rotation of the bolt 30 and/or the nut 32 generally causes axial motion of the nut 32 along the bolt 30. But, given that the nut 32 is coupled to the planar surface, rotation of the bolt 30 and/or the nut 32 results in axial motion of the bolt 30 with respect to the planar surface. And, given that the end of the bolt 30 is mechanically connected to the electrically reactive component 28, rotation of the bolt 30 and/or the nut 32 and the resulting axial motion of the bolt 30 apply either a tension force or a compression force, depending on direction of motion, to the electrically reactive component 28. For example, a first direction of axial motion, such as down, of the bolt 30 applies a tension force to the electrically reactive component 28. A second direction of axial motion, such as up, of the bolt 30 applies a compression force to the electrically reactive component 28. Each of the tension force and the compression force applied the electrically reactive component 28 changes the shape and/or dimension of the electrically reactive component 28. For example, the forces may change a separation distance or orientation of parallel plates forming the capacitor, which in turn may vary the capacitance. The forces may change a length or cross-sectional area of a coil which forms the inductor, thereby changing its inductance. Changes in the capacitance and/or the inductance changes the reactance of the electrically reactive component 28. Further, changes in the voltage applied across the electrically reactive component 28 changes the reactance of the electrically reactive component 28. For example, increasing or decreasing the voltage changes the capacitance even if the distance or orientation of parallel plates is not changed. Similarly, increasing or decreasing the voltage changes the inductance even if the length or cross-sectional area of the coil is not changed. A change in reactance of the electrically reactive component 28 may be achieved by changing the voltage, applying forces to the electrically reactive component 28, or doing both. Without departing from the scope of the invention, the electrically reactive component 28 could be located on an alternative structure that does not produce forces where altering the voltage may be the means for changing the reactance of the electrically reactive component 28. Changes in the reactance of the electrically reactive component 28 may increase or may decrease the frequency at which the radiating element 12 (to which the electrically reactive component 28 is electrically connected) resonates—thereby tuning the electrically small antenna 10.

Figure 11:
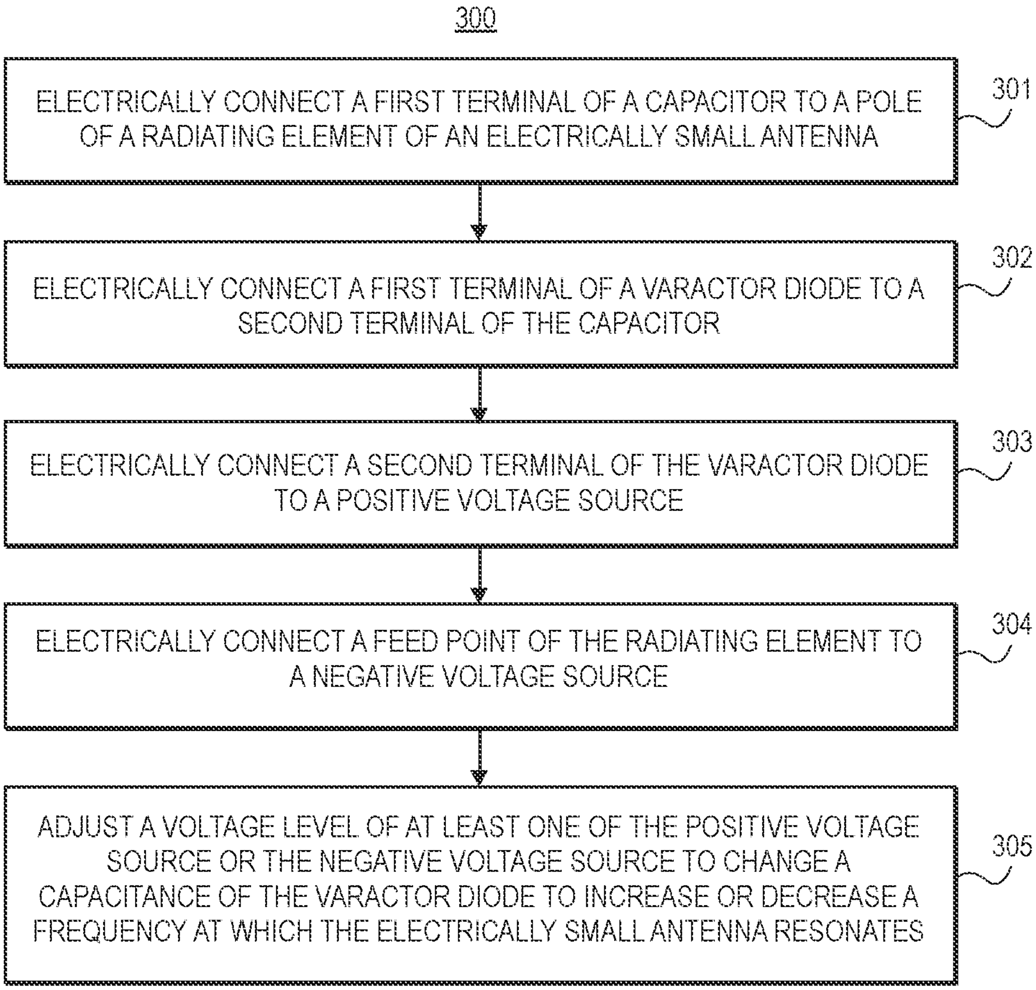
FIG. 11 illustrates a listing of the steps of a third method of tuning an electrically small antenna.
Figure 12:
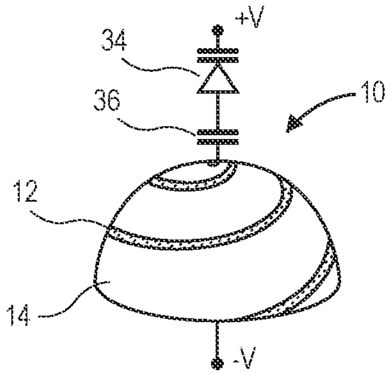
FIG. 12 is a perspective view of the electrically small antenna with a capacitor and a varactor diode to implement the second method of tuning the electrically small antenna.
Figure 13:
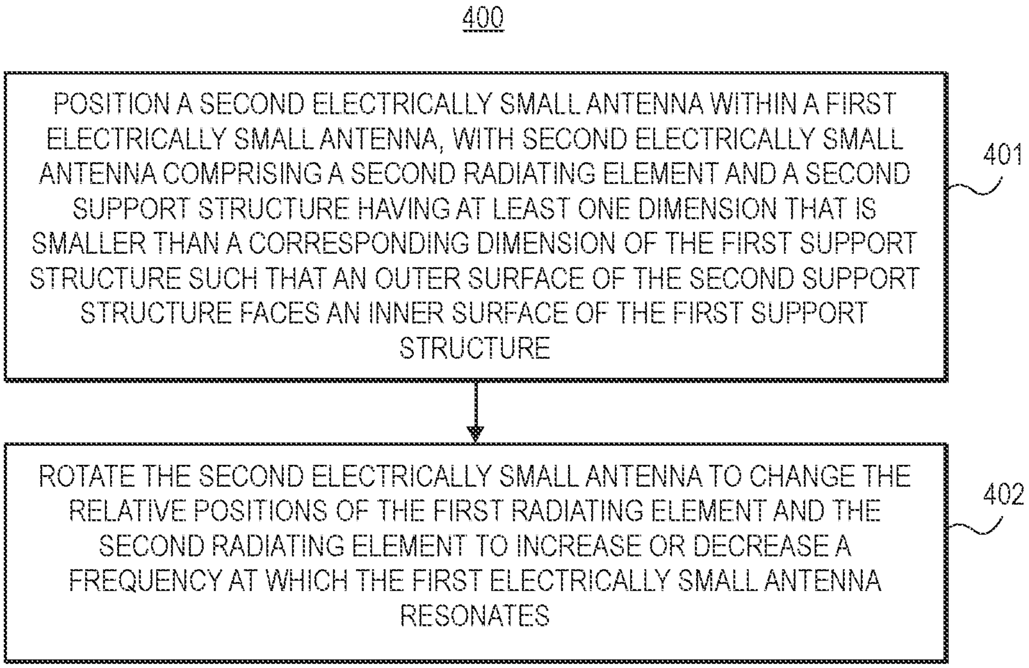
FIG. 13 illustrates a listing of the steps of a fourth method of tuning an electrically small antenna.

Referring to FIGS. 11 and 12, a third method 300 of tuning the electrically small antenna 10 is illustrated. At least a portion of the steps of the method 200 are listed in FIG. 11. The steps may be performed in the order shown in FIG. 11, or they may be performed in a different order. Furthermore, some steps may be performed concurrently as opposed to sequentially. In addition, some steps may be optional or may not be performed. The method 300 broadly involves active electronic tuning. The electrically small antenna 10 may optionally be retained on a planar surface or other object. A varactor diode 34 and a capacitor 36, as shown in FIG. 12, are also included to implement the method 300. The varactor diode 34 is an active device variable capacitance diode or a voltage controlled capacitor. Thus, the capacitance of the device may vary according to the voltage across it. Referring to step 301, a first terminal of the capacitor 36 is electrically connected to the pole of the radiating element 12. Referring to steps 302 and 303, a cathode of the varactor diode 34 is electrically connected to a positive voltage source, and an anode of the varactor diode 34 is electrically connected to a second terminal of the capacitor 36. Referring to step 304, the feed point of the radiating element 12 is electrically connected to a negative voltage source. Referring to step 305, the voltage values of the positive voltage source and the negative voltage source may be adjusted in order to control the voltage across the varactor diode 34, which in turn adjusts the capacitance. Changes in the capacitance of the varactor diode 34 may increase or may decrease the frequency at which the radiating element 12 (to which the varactor diode 34 is electrically connected) resonates—thereby tuning the electrically small antenna 10.

Referring to FIGS. 13, 14A, 14B, and 14C, a fourth method 400 of tuning a first electrically small antenna 500 is illustrated. At least a portion of the steps of the method 400 are listed in FIG. 13. The steps may be performed in the order shown in FIG. 13, or they may be performed in a different order. Furthermore, some steps may be performed concurrently as opposed to sequentially. In addition, some steps may be optional or may not be performed. The method 400 broadly involves placing a second electrically small antenna 510 that is either larger or smaller than the first electrically small antenna 500 either outside or inside the first electrically small antenna 500. Referring to step 401, the first electrically small antenna 500 is substantially similar to the electrically small antenna 10 and includes a first radiating element 502 and a first support structure 504. The second electrically small antenna 510 includes a second radiating element 512 and a second support structure 514, which are functionally equivalent to the radiating element 12 and the support structure 14, respectively. In some embodiments such as those shown in FIG. 14A, the second radiating element 512 has a length that is less than the length of the first radiating element 502, and the second support structure 514 has a radius, or other dimension, that is less than the radius, or other dimension, of the first support structure 504. As highlighted in the cross section of FIG. 14B, the second electrically small antenna 510 is positioned in the interior of the first electrically small antenna 500 such that an inner surface of the first support structure 504 is spaced apart from and surrounds the outer surface of the second support structure 514. The base of the second support structure 514 is generally aligned with the base of the first support structure 504. In other embodiments, the second radiating element 512 has a length that is greater than the length of the first radiating element 502, and the second support structure 514 has a radius, or other dimension, that is greater than the radius, or other dimension, of the first support structure 504. The second electrically small antenna 510 is positioned on the outside of the first electrically small antenna 500 such that an inner surface of the second support structure 514 surrounds the outer surface of the first support structure 504 and the base of the second support structure 514 is generally aligned with the base of the first support structure 504.

Figure 14A:
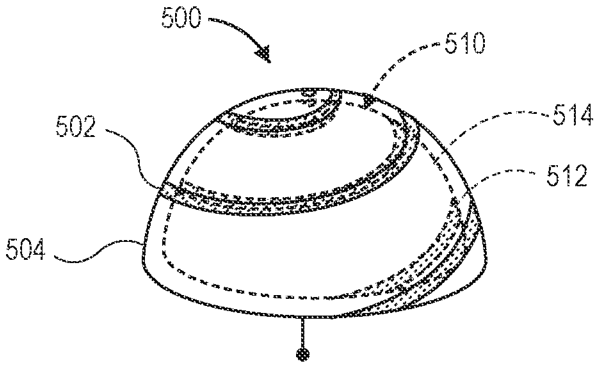
FIG. 14A is a perspective view of a first electrically small antenna and a second electrically small antenna to implement the fourth method of tuning the electrically small antenna.
Figure 14B:
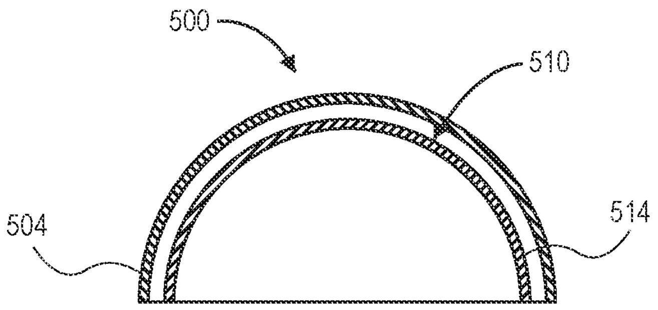
FIG. 14B is a cross-sectional view, cut along a vertical plane, of the first electrically small antenna and the second electrically small antenna.
Figure 14C:
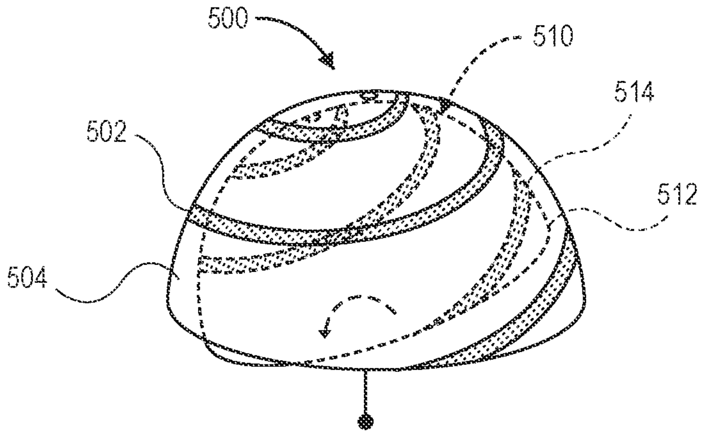
FIG. 14C is a perspective view of the first electrically small antenna and the second electrically small antenna being rotated to implement the fourth method of tuning the electrically small antenna.

The first electrically small antenna 500 may be driven with an electronic signal, while the second electrically small antenna 510 may be passive and may not receive an electronic signal. Alternatively, the first radiating element 502 may be electrically connected to the second radiating element 512. Referring to step 402, in either situation, the second electrically small antenna 510 is rotated along its base, as shown in FIG. 14C, such that the base of the second support structure 514 is either aligned, or not aligned, with the base of the first support structure 504. The second electrically small antenna 510 is rotated along its base in either a clockwise direction or a counterclockwise direction. Alternatively, the first electrically small antenna 500 may be rotated along its base. Or, the first electrically small antenna 500 and the second electrically small antenna 510 may each be rotated in directions opposing one another. Driving at least the first electrically small antenna 500 with an electronic signal results in an inductive and/or magnetic coupling between the first radiating element 502 and the second radiating element 512. The rotation of one electrically small antenna 500, 510 relative to the other electrically small antenna 500, 510 changes the relative position of the radiating elements 502, 512 and results in a change in the amount of inductive and/or magnetic coupling between the first radiating element 502 and the second radiating element 512. Changes in the amount of inductive and/or magnetic coupling may increase or may decrease the frequency at which the first radiating element 502 resonates—thereby tuning the electrically small antenna 500.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method of tuning a first electrically small antenna comprising a first radiating element and a first support structure supporting the first radiating element, the method comprising:

positioning a second electrically small antenna within the first electrically small antenna, the second electrically small antenna including a second radiating element and a second support structure; and rotating at least one of the first electrically small antenna and the second electrically small antenna to change the relative positions of the first radiating element and the second radiating element.

2. The method of claim 1, wherein the second radiating element and the second support structure each have at least one dimension that is smaller than a corresponding dimension of the first radiating element and the first support structure, respectively.

3. The method of claim 1, wherein after positioning the second electrically small antenna within the first electrically small antenna, an outer surface of the second support structure faces an inner surface of the first support structure.

4. The method of claim 1, wherein rotating at least one of the first electrically small antenna and the second electrically small antenna increases or decreases a frequency at which the first electrically small antenna resonates.

5. The method of claim 1, wherein the first support structure includes a first base and the second support structure includes a second base, and after positioning the second electrically small antenna within the first electrically small antenna, the first base is roughly aligned with the second base, and after rotating at least one of the first electrically small antenna and the second electrically small antenna, the first base is not aligned with the second base.

6. The method of claim 1, wherein the first support structure and the second support structure each have a hemispheric shape including a circumferential base and an apex.

7. The method of claim 1, wherein the first radiating element is a monopole antenna.

8. A method of tuning a first electrically small antenna comprising a first radiating element and a first support structure supporting the first radiating element, the method comprising:

positioning a second electrically small antenna within the first electrically small antenna, the second electrically small antenna including a second radiating element and a second support structure, wherein the first support structure and the second support structure each have a hemispheric shape including a circumferential base and an apex and the base of the first support structure is roughly aligned with the base of the second support structure; and rotating at least one of the first electrically small antenna and the second electrically small antenna to change the relative positions of the first radiating element and the second radiating element and such that the base of the first support structure is not aligned with the base of the second support structure.

9. The method of claim 8, wherein the second radiating element and the second support structure each have at least one dimension that is smaller than a corresponding dimension of the first radiating element and the first support structure, respectively.

10. The method of claim 8, wherein after positioning the second electrically small antenna within the first electrically small antenna, an outer surface of the second support structure faces an inner surface of the first support structure.

11. The method of claim 8, wherein rotating at least one of the first electrically small antenna and the second electrically small antenna increases or decreases a frequency at which the first electrically small antenna resonates.

12. The method of claim 8, wherein the first radiating element is a monopole antenna.

13. An electrically small antenna assembly comprising:

a first electrically small antenna including a first radiating element and a first support structure supporting the first radiating element; and a second electrically small antenna positioned within the first electrically small antenna, the second electrically small antenna including a second radiating element and a second support structure supporting the second radiating element, wherein at least one of the first electrically small antenna and the second electrically small antenna is configured to be rotated to change the relative positions of the first radiating element and the second radiating element.

14. The electrically small antenna assembly of claim 13, wherein the second radiating element and the second support structure each have at least one dimension that is smaller than a corresponding dimension of the first radiating element and the first support structure, respectively.

15. The electrically small antenna assembly of claim 13, wherein an outer surface of the second support structure faces an inner surface of the first support structure.

16. The electrically small antenna assembly of claim 13, wherein the first electrically small antenna is configured to electrically connect to an electronic signal.

17. The electrically small antenna assembly of claim 13, wherein rotation of the at least one of the first electrically small antenna and the second electrically small antenna increases or decreases a frequency at which the first electrically small antenna resonates.

18. The electrically small antenna assembly of claim 13, wherein the first support structure has a hemispheric shape including a circumferential first base and a first apex and the second support structure has a hemispheric shape including a circumferential second base and a second apex.

19. The electrically small antenna assembly of claim 18, wherein the first base is roughly aligned with the second base before any rotation.

20. The electrically small antenna assembly of claim 13, wherein the first radiating element is a monopole antenna.

* * * * *